United States Patent [19]
Hinz et al.

[11] Patent Number: 5,188,856
[45] Date of Patent: Feb. 23, 1993

[54] METHOD OF DRYING LUMPY AGRICULTURAL PRODUCTS

[75] Inventors: Wolfgang Hinz, Baden; Ernst Gass, Herznach, both of Switzerland

[73] Assignee: Swag Zschokke Wartmann AG, Dottingen, Switzerland

[21] Appl. No.: 678,137

[22] Filed: Apr. 1, 1991

[30] Foreign Application Priority Data

Apr. 2, 1990 [DE] Fed. Rep. of Germany ....... 4010594

[51] Int. Cl.⁵ ................................................ A23B 7/00
[52] U.S. Cl. ......................................... 426/465; 34/15; 426/520; 426/615
[58] Field of Search ....................... 426/465, 520, 615; 34/15

[56] References Cited

U.S. PATENT DOCUMENTS

| | | | |
|---|---|---|---|
| 2,541,859 | 2/1951 | Callaghan et al. | 426/465 |
| 4,055,675 | 10/1977 | Popper et al. | 426/465 |
| 4,421,020 | 12/1983 | Gross | 99/472 |

FOREIGN PATENT DOCUMENTS

| | | |
|---|---|---|
| 0252155 | 12/1986 | European Pat. Off. . |
| 0363553 | 1/1988 | European Pat. Off. . |
| WO86/01686 | 5/1986 | World Int. Prop. O. . |

Primary Examiner—George Yeung
Attorney, Agent, or Firm—Fay, Sharpe, Beall, Fagan, Minnich & McKee

[57] ABSTRACT

After a thermal treatment the products are subjected to an overpressure treatment of at least 10 seconds. Afterwards, an expansion is effected from the state of overpressure directly to the state of vacuum, wherewith the cells are opened such that the subsequent drying in the vacuum proceeds faster and a porous structure is arrived at.

8 Claims, 1 Drawing Sheet

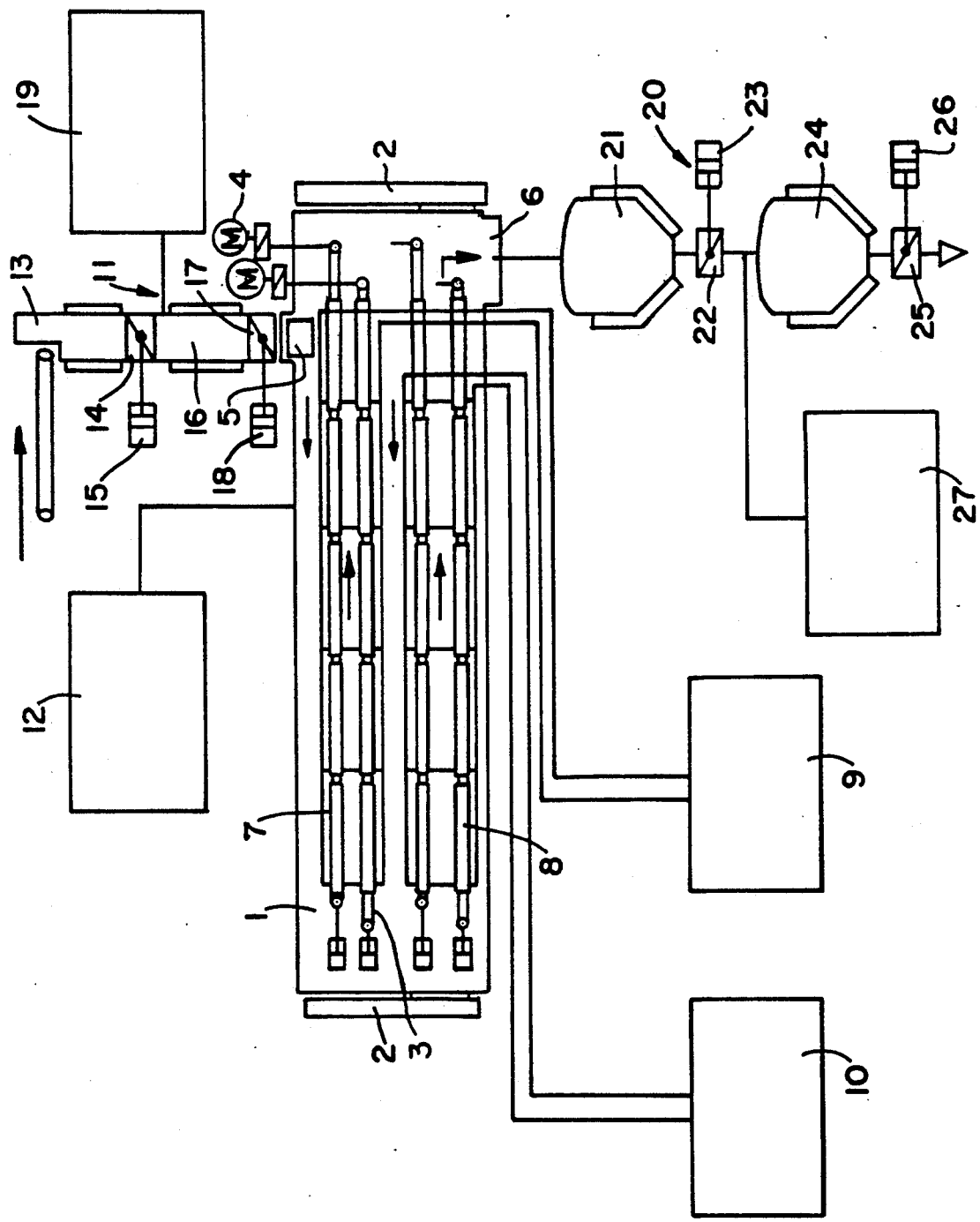

METHOD OF DRYING LUMPY AGRICULTURAL PRODUCTS

BACKGROUND OF THE INVENTION

1. FIELD OF THE INVENTION

The present invention relates to a method of treating lumpy biological products, which products are subjected to a thermal treatment, an expansion to vacuum conditions and a drying at vacuum conditions.

2. DESCRIPTION OF THE PRIOR ART

According to the known methods the drying of lumpy vegetable and fruit products use is made of the so-called puffing or of the expanding in order to support the drying. Thereby, an expansion is made from an over-pressure of several bar (1 bar = 14.5 psi) down to atmospheric pressure. Hereby a structural change occurs because the opened cells collapse. The products thus display a harder and tougher structure.

A plant is known, in which an expansion is made from atmospheric pressure down to a vacuum. It is, however, foreseen to effect a moistening by means of water vapor together with the thermal treatment. It, hereby, has been found to be a drawback that the state of the vacuum is reached only very slowly, wherewith a pressure equalization and conclusively a too low pressure gradient occurs.

SUMMARY OF THE INVENTION

Hence, it is a general object of the present invention to provide a method of treating lumpy biological products which does not have the above mentioned drawbacks and which leads to a maintaining of the complete content of nourishment fibres and does not need any chemical additives.

A further object is to provide a method of treating the products having the steps of subjecting the products to an overpressure treatment in an environment of a gaseous medium selected from the group inert gas, dry air, carbon dioxide and mixtures thereof, and thereafter of an expansion to vacuum conditions at a pressure difference $\Delta p$ which at least is higher than about 1 bar.

Still a further object is to provide a method at which the products keep their shape to the greatest extent, get highly porous such that a high consumption of water is made possible, where due to the limited heating a high stability of vitamins is recognizable and which method is a purely physical method.

BRIEF DESCRIPTION OF THE DRAWING

The invention will be better understood and objects other than those set forth above will become apparent when consideration is given to the following detailed description thereof. Such description makes reference to the annexed drawing, wherein:

The single figure illustrates a block diagram of a preferably used single chamber-vacuum conveyer drying machine for practicing the method.

DESCRIPTION OF THE PREFERRED EMBODIMENT

The single chamber-vacuum conveyer drying machine is used, for instance, for drying slices of apples. Four conveyer belts 3 are arranged above each other in a cylinder shaped, lying receptacle 1, which is shut at both ends by doors 2. The belts 3 are arranged at vertical distances from each other and staggered relative to their longitudinal extent and are driven by a drive 4 located outside of the receptacle. The receptacle 1 includes an inlet stub 5 located at the top and an outlet stub 6 located at the bottom at generally the area of one end of the receptacle. Accordingly, the feeding of the slices of apples to be dried proceeds from above and the discharging of the dried slices of apples towards the bottom.

Between the upper and the lower run of the two upper conveyer belts 3 a plurality of plate shaped heating elements 7 are located in such a fashion beside each other that the upper run contacts the upper side of the heating element 7 such to transfer the heating energy via the upper run onto the product. Plate shaped cooling elements 8 located at the side of each other are arranged between the lower conveyer belts such to transmit the cooling energy onto the upper run or product, respectively, similar as is the case at the heating elements.

The heating and cooling, respectively, elements are controlled by control apparatuses 9 and 10, respectively. The pressure in the receptacle is generated by a vacuum apparatus 12.

A feed lock 11 is mounted at the inlet stub 5. The pressure in the feed lock 11 is generated by a vacuum apparatus 19. This feed lock includes an inlet receptacle 13 followed by a valve 14, which has a pneumatic drive 15, followed in turn by an intermediate receptacle 16 and a second valve 17, which interconnects the intermediate receptacle 16 and the inlet stub 5 and includes a pneumatic drive 18. The inlet stub 5 is combined with a dosing apparatus adapted to distribute the product evenly on the uppermost belt.

A discharge lock 20 is mounted at the outlet stub 6. The discharge lock 20 includes an intermediate receptacle 21 which is connected to the outlet stub 6, a first flap 22, which follows the intermediate receptacle and includes a pneumatic drive 23, a discharge receptacle 24, which follows the flap 22 and a discharge flap 25 having a pneumatic drive 26. The pressure in the discharge lock 20 is generated by a vacuum apparatus 27. The heating proceeds according to an embodiment by dielectric effects because such allows advantageously an avoiding of the surfaces getting horny and leads additionally to an achieving of uniform product temperatures. After this pretreatment the product is placed as charging product into a storage container, in which it maintains its temperature. From this storage container the product is transferred via a valve 14 into a pressure container 16 for the pressure treatment. In this container the product is made subject to an overpressure of a magnitude which depends on the specific product to be dried and which can amount up to 15 bar (217.5 psi). The pressure is generated, for instance, by inert gas, dry air, carbon monoxide and mixtures thereof. The product is exposed to this overpressure during up to 105 minutes. Thereafter, the product is transported in a feed lock like manner via a further valve 17 into a vacuum conveyer drying machine, in which a vacuum prevails. The transition from the pressure treatment to the expansion is made such that a highest as possible pressure gradient $\Delta p$ which exceeds e.g. 1 bar (14.5 psi) occurs during a short time span of less than 30 seconds. The cells are hereby opened and due to the short time span no pressure equalization by diffusion occurs. These procedures are essential parts of the method.

Examples of a drying of various products are given below:

EXAMPLE 1

| Product to be dried: Slices of apples | |
|---|---|
| Initial moistness | up to 25% |
| Entry temperature | up to 105° C. (220° F.) |
| Pressure range in the pretreatment chamber | up to 15 bar (217.5 psi) |
| Dwell time | up to 105 minutes |
| Expansion in the vacuum container with absolute pressure | up to 900 bar (13050 psi) up to 8%, preferably |
| Final moistness | less than 2%. |

EXAMPLE 2

| Product to be dried: Onions | |
|---|---|
| Initial moistness | up to 65% |
| Entry temperature | up to 130° C. (260° F.) |
| Pressure range in the pretreatment chamber | up to 3 bar (43.5 psi) |
| Dwell time | up to 5 minutes |
| Expansion in the vacuum container with absolute pressure | up to 50 bar (725 psi) up to 8%, preferably |
| Final moistness | less than 2%. |

While there are shown and described present preferred embodiments of the invention, it is to be distinctly understood that the invention is not limited thereto, but may be otherwise variously embodied and practiced within the scope of the following claims.

We claim:

1. A method of treating a chunky agricultural product comprising the steps of subjecting said product to a heat treatment while maintaining an overpressure of a gaseous medium selected from the group consisting of a insert gas, dry air, carbon dioxide and mixtures thereof, and thereafter releasing said gaseous medium to vacuum at a pressure difference $\Delta p$ which is at least higher than about 1 bar while drying said product at vacuum conditions, whereby the cells of the product are expanded when released to vacuum and the product to dewatered during vacuum drying.

2. The method of claim 1 wherein said product is subjected to an expansion from a state of overpressure directly to a state of vacuum, which overpressure is higher than about 1.1 bar.

3. The method of claim 1, wherein said product is subjected to an expansion during a pretreatment step.

4. The method of claim 1, wherein said product is subjected to an expansion during the drying step.

5. The method of claim 4, wherein the expansion takes place within a time span less than about 30 seconds.

6. The method of claim 1, wherein the heat treatment proceeds by dielectric effects.

7. The method of claim 1, wherein the overpressure treatment takes place during at least about 10 seconds.

8. The method of claim 1, wherein the drying is effected in a vacuum conveyer drying machine.

* * * * *